March 9, 1943.  M. J. BALDWIN  2,313,503

PROTECTIVE POWER SYSTEM

Filed June 27, 1942

Inventor:
Morris J. Baldwin,
by Harry E. Dunham
His Attorney.

Patented Mar. 9, 1943

2,313,503

UNITED STATES PATENT OFFICE 2,313,503

PROTECTIVE POWER SYSTEM

Morris J. Baldwin, Lawrence Park, Pa., assignor to General Electric Company, a corporation of New York Application June 27, 1942, Serial No. 448,803

22 Claims. (Cl. 290—14)

My invention relates to protective power systems and more particularly to such systems used for self propelled vehicles, such as locomotives, provided with a plurality of driving motors to protect against wheel slippage.

An object of my invention is to provide an improved protective power system for minimizing wheel slippage.

Another object of my invention is to provide an improved power system for self-propelled vehicles wherein the power supplied to the driving motors is reduced if a driving wheel driven by a motor tends to slip.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
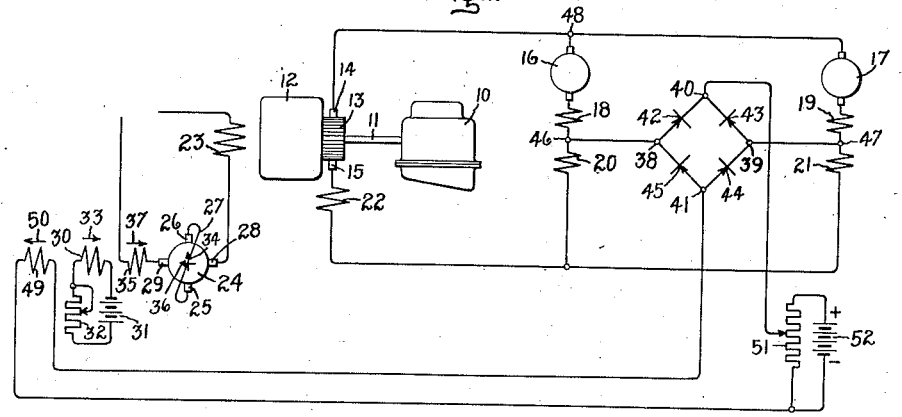
Figure 2:
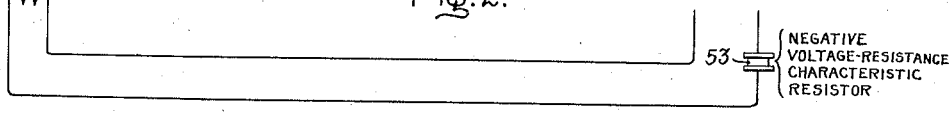
Figure 3:
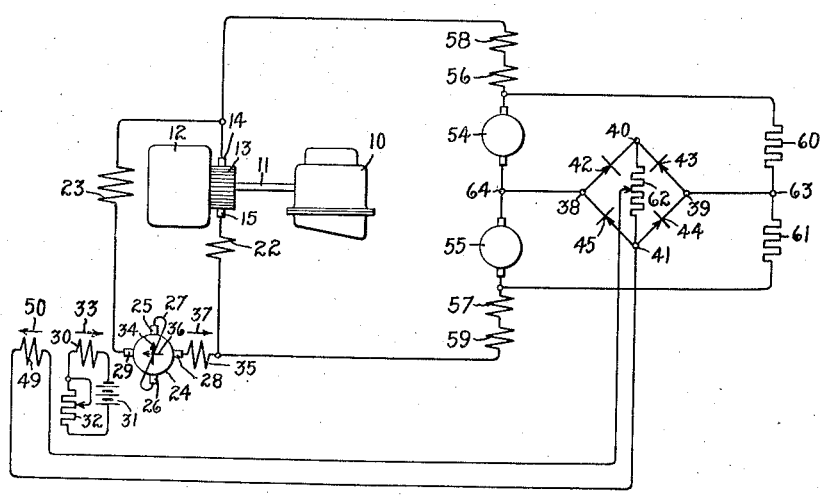

In the drawing, Fig. 1 schematically illustrates a power system wherein a plurality of motors is adapted to be supplied with power from a main generator for driving a self-propelled vehicle, and these motors are arranged in a pair of balanced circuits adapted to control the excitation of an exciter connected to the main field exciting winding of the main generator to minimize wheel slippage; Fig. 2 illustrates a modification of a portion of the system shown in Fig. 1; and Fig. 3 schematically illustrates another modification of the arrangement shown in Fig. 1.

Referring to the drawing, I have shown a power system adapted to drive a self-propelled vehicle having a prime mover 10, such as a Diesel engine, provided with a shaft 11 arranged to drive the armature of a main electric generator 12. The generator is provided with an armature having a winding connected to a commutator 13, and a set of brushes 14 and 15 provide an electrical contact with the commutator 13 and is connected to a plurality of vehicle driving motors 16 and 17. These driving motors are adapted to drive the wheels of the self-propelled vehicle and are connected in a pair of normally balanced electrical circuits by connecting the armatures of the motors 16 and 17 and the commutating fields 18 and 19 thereof in parallel with each other and also connecting series field exciting windings 20 and 21, of the motors 16 and 17, respectively, in series with the armatures of the respective motors and in parallel with each other. The two motors 16 and 17 and the respective series field exciting windings of these motors form a pair of parallel circuits connected across the brushes 14 and 15 of the main generator 12 and a commutating field exciting winding 22 connected in series with the main generator brush 15. The main field excitation of the generator 12 is provided by a separately excited field exciting winding 23 which is adapted to be energized by an armature reaction excited dynamo-electric machine arranged as an exciter adapted to be driven by any suitable source of mechanical power. The armature reaction excited dynamo-electric machine shown in this figure is an amplidyne exciter provided with an armature 24 and a set of primary brushes 25 and 26 which are short circuited by an electrical conductor 27 to provide a primary circuit through the armature 24. A set of secondary or load brushes 28 and 29 is arranged about the commutator of the amplidyne exciter and displaced substantially 90 electrical degrees thereabout from the primary brushes 25 and 26 to provide a secondary circuit through the armature 24 of the amplidyne exciter. The main control excitation of the amplidyne exciter is provided by a field exciting winding 30 which is adapted to be energized by any suitable source of electrical power supply, such as a battery 31, and may be varied by a variable resistor 32 connected in series with the field exciting winding 30 and battery 31. Energization of the field exciting winding 30 provides a component of excitation to the amplidyne exciter as indicated by the arrow 33, and rotation of the armature 24 generates a voltage in the armature which causes current to flow through the primary circuit of the armature. This flow of electric current through the primary armature circuit produces a primary component of armature reaction as indicated by the arrow 34 which is cut by the conductors of the armature winding connected to the commutator between the secondary brushes 28 and 29. These brushes 28 and 29 are connected to the main generator field exciting winding 23 and in series with an exciter compensating field exciting winding 35. When current flows through the main generator field exciting winding 23 and the exciter secondary brushes 28 and 29 a secondary component of armature reaction is produced in the exciter as indicated by the arrow 36 opposed to the control component of excitation 33 provided by the exciter control field exciting winding 30. The exciter compensating field exciting winding 35 is constructed and arranged such that the flow of electric current through this winding provides a component of excitation to the amplidyne exciter as indicated by the arrow 37, which is substantially equal and opposite to the secondary component of armature reaction 36, and thereby minimizes any back coupling effects of secondary or load current in the armature with the main exciter control field exciting winding 30. The components of excitation provided by the exciter main control field exciting winding 30 and the compensating field exciting winding 35 are both arranged along the secondary commutating axis of the amplidyne exciter, and, therefore, act along the same axis as the secondary or load component of armature reaction 36.

In order to prevent wheel slippage of the driving wheels of the vehicle driven by the motors 16 and 17, I provide an electrical interconnection between the series and commutating field exciting windings of the two motors and utilize the amplidyne exciter to control the torque developed by the motors by controlling the excitation of the main generator for restoring substantially balanced torque to all of the motors. This interconnection includes an electrical bridge circuit having two pairs of diametrical terminals 38 and 39 and 40 and 41. One-way rectifiers 42, 43, 44, and 45 are connected respectively between the sets of terminals 38 and 40, 40 and 39, 39 and 41, and 41 and 38 in the form of a full-wave rectifier capable of passing current from the terminal 41 to the terminals 38 and 39 and from these terminals to the terminal 40. With such an arrangement, current may pass into the bridge circuit at the terminal 41 and out of the bridge circuit at the terminal 40 irrespective of whether the terminal 38 or the terminal 39 is the terminal of higher potential. The connection points 46 and 47 between the commutating windings 18 and 19 and the motor series field exciting windings 20 and 21, respectively, normally are equipotential points in the pair of normally balanced motor circuits. These normally balanced motor circuits are so arranged that when the driving wheels of the vehicle operate at substantially the same speed from standstill to any desired speed, the motors 16 and 17 operate at substantially the same speed and the points 46 and 47 remain at substantially the same potential. However, if one of the wheels tends to slip, the armature of the motor which is driving that wheel will operate at a higher speed than the armature of the motor which drives a wheel which is not slipping. This results in the generation of a higher back-electromotive force in the armature of the motor driving the wheel which slips and, therefore, unbalances the voltage between the common connection point 48 of the two motors to the generator brush 14 and the normally equipotential points 46 and 47, such that one of these latter points connected to the motor driving the slipping wheel is at a lower potential than the point which is connected to the other motor, and current will tend to flow from the point connected to the motor arranged to drive the non-slipping wheel toward the point connected to the motor driving the slipping wheel. In so doing, current will tend to flow through the full-wave rectifiers out of the terminal 40. The diametric pair of terminals 40 and 41 is connected to a field exciting winding 49 arranged to provide a component of excitation as indicated by the arrow 50 along the secondary commutating axis of the amplidyne exciter in opposition to the excitation provided by the main control field exciting winding 30. The terminals 40 and 41 of the bridge circuit are connected in opposition to a bias voltage across a potentiometer 51 connected to a source of electric power supply, such as a battery 52. This provides against the excitation of the field exciting winding 49 below a predetermined unbalance in the voltage between the points 46 and 47 and prevents unnecessary variations in the excitation of the amplidyne exciter and, consequently, in the excitation of the main generator 12 due to slight electrically unbalanced conditions in the driving motor circuits. Thus, if a wheel driven by one of the motors 16 or 17 slips to such an extent that the difference in voltage between the normally equipotential points 46 and 47 and, therefore, across the pair of diametric bridge circuit terminals 40 and 41, is greater than the bias voltage of the potentiometer 51, an electric current flows through the field exciting winding 49 and provides a component of excitation 50 in opposition to the component of excitation 33 provided by the control field exciting winding 30, thereby decreasing the excitation of the amplidyne exciter and decreasing the energization of the main generator field exciting winding 23. This results in a decrease in the voltage across the driving motors 16 and 17, such that the motor driving the slipping wheel is not sufficiently energized to continue driving the wheel. When slippage of the wheel ceases, the two motors 16 and 17 again will provide a pair of normally balanced electrical circuits, and the amplidyne exciter field exciting winding 49 will become deenergized, such that the excitation provided to the generator by the field exciting winding 23 will be restored to normal, thereby again providing the desired voltage for normal operation of the driving motors 16 and 17. In this manner, protection against wheel slippage is provided with inherent restoration of the power supplied to the driving motors when the two normally balanced circuits of the motors are restored to balanced conditions.

In Fig. 2 I have shown a modification of the wheel slip-preventing control circuit shown in Fig. 1 wherein the amplidyne exciter field exciting winding 49 is arranged on the exciter in the same manner as that shown in Fig. 1. This field exciting winding is connected across the diametrical terminals 40 and 41 of the bridge circuit in series with a negative voltage-resistance characteristic resistor 53. The remainder of the power circuit may be substantially the same as that shown in Fig. 1. The arrangement of this negative voltage resistance characteristic resistor in series with the amplidyne exciter field exciting winding 49 has the effect of preventing the flow of current in this circuit below a predetermined difference in potential between the diametrical terminals 40 and 41 of the bridge circuit and, therefore, between the points 46 and 47 of the balanced motor circuits. Furthermore, when the predetermined voltage difference occurs, the resistance of the resistor 53 decreases and a relatively large current flows through the field exciting winding 49, thereby providing a large component of excitation and quick response of the amplidyne exciter 24 to the excitation of this field exciting winding. This provides for a rapid and effective response of the main generator 12 and thereby minimizes wheel slippage of the wheels driven by the driving motors 16 and 17.

In Fig. 3 I have shown a modification of the self-propelled vehicle driving power system having a slightly different arrangement of the driving motors and the amplidyne exciter control. In this system, a prime mover 10, such as a Diesel engine provided with a shaft 11, is arranged to drive the armature 12 of a main electric generator. This generator armature is provided with a winding connected to a commutator 13, and a set of brushes 14 and 15 is arranged in contact with the commutator 13 and connected to a plurality of vehicle wheel driving motors 54 and 55. These motors are connected in series with each other and are provided with main series field exciting windings 56 and 57 and commutating field exciting windings 58 and 59, respectively. The driving motors 54 and 55 are connected in a pair of normally balanced electrical circuits by connecting the armatures of these motors in parallel with resistors 60 and 61, respectively, through an electrical interconnection including a full-wave rectifier bridge circuit.

The excitation of the main generator is provided by a field exciting winding 23, as in the arrangement shown in Fig. 1, which is adapted to be energized by an armature reaction excited dynamo-electric machine arranged as an exciter adapted to be driven by any suitable source of mechanical power. In this figure, the exciter is an amplidyne type machine provided with an armature 24 and a set of primary brushes 25 and 26 which are short-circuited by an electrical conductor 27 to complete a primary circuit through the armature 24. A set of secondary or load brushes 28 and 29 is arranged about the commutator of the amplidyne exciter and displaced substantially 90 electrical degrees thereabout from the primary brushes 25 and 26 to provide a secondary circuit through the amplidyne exciter armature 24.

The amplidyne exciter is controlled by a main control field exciting winding 30 adapted to be energized by any sutiable source of power supply, such as a battery 31, and may be varied by a variable resistor 32 connected in series with the field exciting winding 30 and the battery 31. Energization of the control field exciting winding 30 provides a component of excitation to the amplidyne exciter along the secondary commutating axis thereof as indicated by the arrow 33, and rotation of the armature 24 generates a voltage in the armature which causes current to flow through the primary circuit of the armature. The flow of electric current through the primary armature circuit produces a primary component of armature reaction as indicated by the arrow 34 which is cut by the conductors of the armature winding connected to the commutator between the secondary brushes 28 and 29. Voltage is generated between these brushes and they are connected in series with the main generator control field exciting winding 23 across the main generator and its commutating field exciting winding 22 and thereby control the excitation of the main generator by varying the effective energization of its control field exciting winding. When current flows through the main generator field exciting winding and the secondary brushes 28 and 29 of the amplidyne exciter, a secondary component of armature reaction 36 is produced along the secondary commutating axis of the exciter in opposition to the excitation 33 provided by the exciter control field exciting winding 30. In order to minimize the current required for energizing the control field exciting winding 30, a compensating field exciting winding 35 is constructed and arranged to provide a component of excitation 37 along the secondary commutating axis of the exciter in opposition to the secondary armature reaction 36 as indicated by the arrow 37. This compensating component of excitation is substantially equal and opposite to the secondary component of armature reaction and thereby minimizes back coupling effects of secondary or load current in the armature 24 with the main exciter control field exciting winding 30.

In order to prevent wheel slippage of the driving wheels of the vehicle, an auxiliary field exciting winding 49 is arranged to provide a component of excitation along the secondary commutating axis of the amplidyne exciter as indicated by the arrow 50 in opposition to the main control component of excitation 33. The energization of this field excitng winding 49 is provided by connecting it across a variable resistance 62 arranged as a potentiometer connected between diametrical terminals 40 and 41 of a bridge circuit which interconnects substantially equipotential mid-points 63 and 64 of the normally balanced electrical circuits including the driving motors 54 and 55 and the resistances 60 and 61. The bridge circuit which interconnects the substantially equipotential points 63 and 64 is provided with two pairs of diametrical terminals 38 and 39 and the terminals 40 and 41. As in the arrangement shown in Fig. 1, one-way rectifiers 42, 43, 44, and 45 are connected respectively between the sets of terminals 38 and 40, 40 and 39, 39 and 41, and 41 and 38 in the form of a full-wave rectifier capable of passing current from the terminal 41 to the terminals 38 and 39, and from these terminals to the terminal 40. With this arrangement, current may pass into the bridge circuit at the terminal 41 and out of the bridge circuit at the terminal 40 and through the variable resistor 62 from the terminal 40 to the terminal 41, irrespective of whether the terminal 38 or the terminal 39 is the terminal of higher potential. The pair of normally balanced motor circuits will maintain the points 63 and 64 at substantially the same potential during normal operation of the motors 54 and 55, irrespective of the speed of the motors, as long as these motors operate at substantially the same speed. However, if one of the wheels driven by a motor tends to slip, the armature of the motor which is driving that wheel will operate at a higher speed than the armature of the motor which drives a wheel which does not slip. The result of this operation is that a higher back-electromotive force is generated in the armature of the motor driving the wheel which slips. This unbalances the voltages of the interconnected points 63 and 64 such that the voltage across the slipping motor becomes higher than the voltage across the non-slipping motor and, therefore, potential of the point 64 between the two motors may be higher or lower than the potential of the point 63 between the resistances 60 and 61, and current may flow through the variable resistance 62 from the diametrical terminal 38 or the diametrical terminal 39 to the diametrical terminal 40 through the resistance 62 to the diametrical terminal 41. Since the auxiliary field exciting winding 49 is connected across the variable resistance 62, energization of this winding may be varied such that it is substantially ineffective in producing excitation below a predetermined drop in potential across the variable resistance 62 and, therefore, below a predetermined difference in potential between the interconnected normally equipotential points 63 and 64. Thus, with this construction current will flow in the same direction through the auxiliary control field exciting winding 49, irrespective of which driving motor 54 or 55 is connected to the slipping wheel, and the excitation provided by this field exciting winding, therefore, will be in the same direction, irrespective of which driving motor drives the slipping wheel. Therefore, if a wheel driven by one of the motors slips to such an extent that the energization of the field exciting winding 49 produces a component of excitation 50 in oppositon to the control field exciting winding component of excitation 33, the voltage of the amplidyne exciter and, therefore, the excitation of the main generator field exciting winding 23 is decreased and the voltage of the main generator also is decreased, such that the motor which drives the slipping wheel is not sufficiently energized to continue driving the wheel. When slippage of the wheel ceases, the two motors 54 and 55 again will provide a pair of normally balanced electrical circuits and the potential of the interconnected points 63 and 64 will become substantially equal, such that the amplidyne exciter field exciting winding 49 will become deenergized. Under this condition, the energization of the main generator field exciting winding 23 is restored to normal, thereby again providing the desired voltage for normal operation of the driving motors 54 and 55. In this manner, protection against wheel slippage is inherently provided with automatic restoration of power to the driving motors when the two normally balanced motor circuits are restored to normal conditions.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States, is:

1. A power system for a vehicle including a prime mover, an electric generator arranged to be driven by said prime mover, a plurality of driving motors, means for connecting said motors to said generator, dynamo-electric means for controlling the torque developed by said motors, a control field exciting winding for said dynamo-electric means, means for connecting said motors in a pair of normally balanced electrical circuits, a second field exciting winding arranged to provide a component of excitation to said dynamo-electric means along the same axis as said control field exciting winding, means for energizing said second field exciting winding responsive to unbalance in said motor normally balanced circuits for providing a component of excitation in opposition to the component of excitation provided by said dynamo-electric means control field exciting winding for restoring substantially balanced torques to all of said motors.

2. A power system for a self-propelled vehicle including a prime mover, an electric generator arranged to be driven by said prime mover, a plurality of driving motors, means for connecting said motors to said generator, means including a field exciting winding for controlling the characteristics of said generator, an exciter connected to said generator field exciting winding, a control field exciting winding for said exciter, means for connecting said motors in a pair of normally balanced electrical circuits, a second field exciting winding arranged to provide a component of excitation along the same axis as said exciter control field exciting winding, unidirectional current means for energizing said exciter second field exciting winding responsive to unbalance in said motor normally balanced circuits for providing a component of excitation in opposition to the component of excitation provided by said exciter control field exciting winding for decreasing the energization of said generator field exciting winding.

3. A power system for a self-propelled vehicle including a prime mover, an electric generator arranged to be driven by said prime mover, a plurality of driving motors, means for connecting said motors to said generator in a pair of normally balanced parallel electrical circuits, means including a field exciting winding for controlling the characteristics of said generator, an exciter connected to said generator field exciting winding, a control field exciting winding for said exciter, an electrical bridge circuit having two pairs of diametrical terminals, means for connecting a pair of said diametrical terminals each to different normally equipotential points of said pair of balanced motor circuits, and means including a second field exciting winding for said exciter connected to the other pair of said diametrical terminals of said bridge circuit for energizing said second exciter field exciting winding responsive to unbalanced currents flowing in said bridge due to unbalance in said motor normally balanced circuits for providing a component of excitation in opposition to the component of excitation provided by said exciter control field exciting winding for decreasing the energization of said generator field exciting winding.

4. A power system for a self-propelled vehicle including a prime mover, an electric generator arranged to be driven by said prime mover, a plurality of driving motors, means for connecting said motors to said generator, means including a field exciting winding for controlling the characteristics of said generator, an exciter connected to said generator field exciting winding, a control field exciting winding for said exciter, means for connecting said motors in a pair of normally balanced electrical circuits, an electrical bridge circuit having two pairs of diametrical terminals, means for connecting a pair of said diametrical terminals each to different normally equipotential points of said pair of balanced motor circuits, and means including a second field exciting winding for said exciter connected to the other pair of said diametrical terminals of said bridge circuit for energizing said exciter second field exciting winding responsive to unbalanced currents flowing in said bridge due to unbalance in said motor normally balanced circuits for providing a component of excitation in opposition to the component of excitation provided by said exciter control field exciting winding for decreasing the energization of said generator field exciting winding.

5. A power system for a self-propelled vehicle including a prime mover, an electric generator arranged to be driven by said prime mover, a plurality of driving motors, means for connecting said motors to said generator, means including a field exciting winding for controlling the characteristics of said generator, an exciter connected to said generator field exciting winding, a control field exciting winding for said exciter, means for connecting said motors in a pair of normally balanced electrical circuits, an electrical bridge circuit having two pairs of diametrical terminals, means for connecting a pair of said diametrical terminals each to different normally equipotential points of said pair of balanced motor circuits, means including a second field exciting winding for said exciter connected to the other pair of said diametrical terminals of said bridge circuit for energizing said exciter second field exciting winding responsive to unbalanced currents flowing in said bridge due to unbalance in said motor normally balanced circuits for providing a component of excitation in opposition to the component of excitation provided by said exciter control field exciting winding, and means including said bridge and a source of electric power supply connected to said exciter second field exciting winding in opposition to said unbalanced bridge energization for substantially preventing energization of said exciter second field exciting winding below a predetermined unbalance in said motor normally balanced circuits.

6. A power system for a self-propelled vehicle including a prime mover, an electric generator arranged to be driven by said prime mover, a plurality of driving motors, means for connecting said motors to said generator in series circuit relationship, means including a field exciting winding for controlling the characteristics of said generator, an exciter connected to said generator field exciting winding, a control field exciting winding for said exciter, means for connecting said motors in parallel with an electrical resistance circuit in a pair of normally balanced electrical circuits each including at least one motor and a part of said resistance circuit in parallel, an electrical bridge circuit having two pairs of diametrical terminals, means for connecting a pair of said diametrical terminals each to different normally equipotential points of said pair of balanced motor circuits, and means including a second field exciting winding for said exciter connected to the other pair of said diametrical terminals of said bridge circuit for energizing said exciter second field exciting winding responsive to unbalanced currents flowing in said bridge due to unbalance in said motor normally balanced circuits for providing a component of excitation in opposition to the component of excitation provided by said exciter control field exciting winding.

7. A power system for a self-propelled vehicle including a prime mover, an electric generator arranged to be driven by said prime mover, a plurality of driving motors, means for connecting said motors to said generator, means including a field exciting winding for controlling the characteristics of said generator, an exciter connected to said generator field exciting winding, a control field exciting winding for said exciter, means for connecting said motors in a pair of normally balanced electrical circuits, an electrical bridge circuit having two pairs of diametrical terminals, means for connecting a pair of said diametrical terminals each to different normally equipotential points of said pair of balanced motor circuits, means including a second field exciting winding for said exciter connected to the other pair of said diametrical terminals of said bridge circuit for energizing said exciter second field exciting winding responsive to unbalanced currents flowing in said bridge due to unbalance in said motor normally balanced circuits for providing a component of excitation in opposition to the component of excitation provided by said exciter control field exciting winding for decreasing the energization of said generator field exciting winding, and means connected to said exciter second field exciting winding for preventing energization thereof below a predetermined unbalance in said motor normally balanced circuits.

8. A power system for a self-propelled vehicle including a prime mover, an electric generator arranged to be driven by said prime mover, a plurality of driving motors, means for connecting said motors to said generator, means including a field exciting winding for controlling the characteristics of said generator, an exciter connected to said generator field exciting winding, a control field exciting winding for said exciter, means for connecting said motors in a pair of normally balanced electrical circuits, an electrical bridge circuit having two pairs of diametrical terminals, means for connecting a pair of said diametrical terminals each to different normally equipotential points of said pair of balanced motor circuits, means including a second field exciting winding for said exciter connected to the other pair of said diametrical terminals of said bridge circuit for energizing said exciter second field exciting winding responsive to unbalanced currents flowing in said bridge due to unbalance in said motor normally balanced circuits for providing a component of excitation in opposition to the component of excitation provided by said exciter control field exciting winding, and means including a voltage control means connected to said exciter second field exciting winding for substantially preventing energization of said exciter second field exciting winding below a predetermined unbalance in said motor normally balanced circuits.

9. A power system for a self-propelled vehicle including a prime mover, an electric generator arranged to be driven by said prime mover, a plurality of driving motors, means for connecting said motors to said generator, means including a field exciting winding for controlling the characteristics of said generator, an exciter connected to said generator field exciting winding, a control field exciting winding for said exciter, means for connecting said motors in a pair of normally balanced electrical circuits, an electrical bridge circuit having two pairs of diametrical terminals, means for connecting a pair of said diametrical terminals each to different normally equipotential points of said pair of balanced motor circuits, means including a second field exciting winding for said exciter connected to the other pair of said diametrical terminals of said bridge circuit for energizing said exciter second field exciting winding responsive to unbalanced currents flowing in said bridge due to unbalance in said motor normally balanced circuits for providing a component of excitation in opposition to the component of excitation provided by said exciter control field exciting winding, and means including a potentiometer connected to said exciter second field exciting winding for varying the energization of said exciter second field exciting winding.

10. A power system for a self-propelled vehicle including a prime mover, an electric generator arranged to be driven by said prime mover, a plurality of driving motors, means for connecting said motors to said generator, means including a field exciting winding for controlling the characteristics of said generator, an exciter connected to said generator field exciting winding, a control field exciting winding for said exciter, means for connecting said motors in a pair of normally balanced electrical circuits, an electrical bridge circuit having two pairs of diametrical terminals, means for connecting a pair of said diametrical terminals each to different normally equipotential points of said pair of balanced motor circuits, means including a second field exciting winding for said exciter connected to the other pair of said diametrical terminals of said bridge circuit for energizing said exciter second field exciting winding responsive to unbalanced currents flowing in said bridge due to unbalance in said motor normally balanced circuits for providing a component of excitation in opposition to the component of excitation provided by said exciter control field exciting winding, and means connected to said exciter second field exciting winding for preventing energization of said second field exciting winding in opposition to said exciter control field exciting winding below a predetermined unbalance in said motor normally balanced circuits.

11. A power system for a self-propelled vehicle including a prime mover, an electric generator arranged to be driven by said prime mover, a plurality of driving motors, means for connecting said motors to said generator, means including a field exciting winding for controlling the characteristics of said generator, an exciter connected to said generator field exciting winding, a control field exciting winding for said exciter, a second field exciting winding for said exciter, means for connecting said motors in a pair of normally balanced electrical circuits, an electrical bridge circuit having four unidirectional current branches connected in a loop providing a full wave rectifier with a pair of diametrical terminals each connected to a pair of connected bridge branches having opposite unidirectional current characteristics and connected to different normally equipotential points of said pair of balanced motor circuits, a second pair of diametrical terminals each connected to a pair of connected bridge branches having the same directional unidirectional current characteristics, and means connecting said exciter second field exciting winding to the latter pair of said diametrical terminals for energizing said exciter second field exciting winding responsive to unbalanced currents flowing in said bridge due to unbalance in said motor normally balanced circuits for providing a component of excitation in opposition to the component of excitation provided by said exciter control field exciting winding.

12. A power system for a self-propelled vehicle including a prime mover, an electric generator arranged to be driven by said prime mover, a plurality of driving motors, means for connecting said motors to said generator, means including a field exciting winding for controlling the characteristics of said generator, an exciter connected to said generator field exciting winding, a control field exciting winding for said exciter, means for connecting said motors in a pair of normally balanced electrical circuits, an electrical bridge circuit having two pairs of diametrical terminals, means for connecting a pair of said diametrical terminals each to different normally equipotential points of said pair of balanced motor circuits, means including a second field exciting winding for said exciter connected to the other pair of said diametrical terminals of said bridge circuit for energizing said exciter second field exciting winding responsive to unbalanced currents flowing in said bridge due to unbalance in said motor normally balanced circuits for providing a component of excitation in opposition to the component of excitation provided by said exciter control field exciting winding, and means including a controllable voltage source of electric power supply connected to said exciter second field exciting winding in opposition to the energization of said bridge circuit for preventing energization of said second field exciting winding in opposition to said exciter control field exciting winding below a predetermined unbalance in said motor normally balanced circuits.

13. A power system for a self-propelled vehicle including a prime mover, an electric generator arranged to be driven by said prime mover, a plurality of driving motors, means for connecting said motors to said generator, means including a field exciting winding for controlling the characteristics of said generator, an armature reaction excited exciter, means including a set of primary brushes and a set of secondary brushes for providing a primary and a secondary circuit respectively through said exciter, means for connecting said generator field exciting winding to said exciter secondary brushes, means including a control field exciting winding for providing a component of excitation along the exciter secondary brush commutating axis, a second field exciting winding arranged to provide a component of excitation along the exciter secondary brush commutating axis, means for connecting said motors in a pair of normally balanced electrical circuits, an electrical bridge circuit having two pairs of diametrical terminals, means for connecting a pair of said diametrical terminals each to different normally equipotential points of said pair of balanced motor circuits, and means connecting said exciter second field exciting winding to the other pair of said diametrical terminals of said bridge circuit for energizing said exciter second field exciting winding responsive to unbalanced currents flowing in said bridge due to unbalance in said motor normally balanced circuits for providing a component of excitation in opposition to the component of excitation provided by said exciter control field exciting winding for decreasing the energization of said generator field exciting winding.

14. A power system for a self-propelled vehicle including a prime mover, an electric generator arranged to be driven by said prime mover, a plurality of driving motors, means for connecting said motors to said generator, means including a field exciting winding for controlling the characteristics of said generator, an armature reaction exciter having a set of primary brushes and a set of secondary brushes for providing a primary and a secondary circuit through said exciter, means for connecting said generator field exciting winding to said exciter secondary brushes, means including a control field exciting winding for providing a component of excitation along the exciter secondary brush commutating axis, a second field exciting winding arranged to provide a component of excitation along the exciter secondary brush commutating axis, means for connecting said motors in a pair of normally balanced electrical circuits, an electrical bridge circuit having two pairs of diametrical terminals, means for connecting a pair of said diametrical terminals each to different normally equipotential points of said pair of balanced motor circuits, means connecting said exciter second field exciting winding to the other pair of said diametrical terminals of said bridge circuit for energizing said exciter second field exciting winding responsive to unbalanced currents flowing in said bridge due to unbalance in said motor normally balanced circuits for providing a component of excitation along said exciter secondary brush commutating axis in opposition to the component of excitation provided by said exciter control field exciting winding for decreasing the energization of said generator field exciting winding, and means connected to said exciter second field exciting winding for preventing energization thereof below a predetermined unbalance in said motor normally balanced circuits.

15. A power system for a self-propelled vehicle including a prime mover, an electric generator arranged to be driven by said prime mover, a plurality of driving motors, means for connecting said motors to said generator, means including a field exciting winding for controlling the characteristics of said generator, an armature reaction excited exciter, means including a set of primary brushes and a set of secondary brushes for providing a primary and a secondary circuit respectively through said exciter, means for connecting said generator field exciting winding to said exciter secondary brushes, means including a control field exciting winding for providing a component of excitation along the exciter secondary brush commutating axis, a second field exciting winding arranged to provide a component of excitation along the exciter secondary brush commutating axis, means for connecting said motors in a pair of normally balanced electrical circuits, an electrical bridge circuit having two pairs of diametrical terminals, means for connecting a pair of said diametrical terminals each to different normally equipotential points of said pair of balanced motor circuits, means connecting said exciter second field exciting winding to the other pair of said diametrical terminals of said bridge circuit for energizing said exciter second field exciting winding responsive to unbalanced currents flowing in said bridge due to unbalance in said motor normally balanced circuits for providing a component of excitation in opposition to the component of excitation provided by said exciter control field exciting winding, and means connected to said exciter second field exciting winding for preventing energization of said second field exciting winding in opposition to said exciter control field exciting winding below a predetermined unbalance in said motor normally balanced circuits.

16. A power system for a self-propelled vehicle including a prime mover, an electric generator arranged to be driven by said prime mover, a plurality of driving motors, means for connecting said motors to said generator, means including a field exciting winding for controlling the characteristics of said generator, an armature reaction excited exciter, means including a set of primary brushes and a set of secondary brushes for providing a primary and a secondary circuit through said exciter, means for connecting said generator field exciting winding to said exciter secondary brushes, means including control field exciting winding for providing a component of excitation along the exciter secondary brush commutating axis, means including a compensating field exciting winding for providing a component of excitation along the exciter secondary brush commutating axis substantially equal and opposite to the armature reaction of electric current through said exciter secondary brushes, a third field exciting winding arranged to provide a component of excitation along the exciter secondary brush commutating axis, means for connecting said motors in a pair of normally balanced electrical circuits, an electrical bridge circuit having two pairs of diametrical terminals, means for connecting a pair of said diametrical terminals each to different normal equipotential points of said pair of balanced motor circuits, means connecting said exciter third field exciting winding to the other pair of said diametrical terminals of said bridge circuit for energizing said exciter third field exciting winding responsive to unbalanced currents flowing in said bridge due to unbalance in said motor normally balanced circuits for providing a component of excitation in opposition to the component of excitation provided by said exciter control field exciting winding for decreasing the energization of said generator field exciting winding.

17. A power system for a self-propelled vehicle including a prime mover, an electric generator arranged to be driven by said prime mover, a plurality of driving motors, means for connecting said motors to said generator, means including a field exciting winding for controlling the characteristics of said generator, an armature reaction excited exciter, means including a set of primary brushes and a set of secondary brushes for providing a primary and a secondary circuit respectively through said exciter, means for connecting said generator field exciting winding to said exciter secondary brushes, means including a control field exciting winding for providing a component of excitation along the exciter secondary brush commutating axis, a second field exciting winding arranged to provide a component of excitation along the exciter secondary brush commutating axis, means for connecting said motors in a pair of normally balanced electrical circuits, an electrical bridge circuit having two pairs of diametrical terminals, means for connecting a pair of said diametrical terminals each to different normally equipotential points of said pair of balanced motor circuits, means connecting said exciter second field exciting winding to the other pair of said diametrical terminals of said bridge circuit for energizing said exciter second field exciting winding responsive to unbalanced currents flowing in said bridge due to unbalance in said motor normally balanced circuits for providing a component of excitation in opposition to the component of excitation provided by said exciter control field exciting winding, and means including a controllable voltage source of electric power supply connected to said exciter second field exciting winding in opposition to the energization of said bridge circuit for preventing energization of said second field exciting winding in opposition to said exciter control field exciting winding below a predetermined unbalance in said motor normally balanced circuits.

18. A power system for a self-propelled vehicle including a prime mover, an electric generator arranged to be driven by said prime mover, an even number of driving motors, means for connecting said motors to said generator, means including a field exciting winding for controlling the characteristics of said generator, an armature reaction excited exciter having a set of primary brushes and a set of secondary brushes for providing a primary and a secondary circuit respectively through said exciter, means for connecting said generator field exciting winding to said exciter secondary brushes, means including a control field exciting winding for providing a component of excitation along the exciter secondary brush commutating axis, means including a compensating field exciting winding for providing a component of excitation along the exciter secondary brush commutating axis substantially equal and opposite to the armature reaction of electric current through said exciter secondary brushes, a third field exciting winding arranged to provide a component of excitation along the exciter secondary brush commutating axis, means for connecting said motors in a pair of normally balanced electrical circuits, an electrical bridge circuit having two pairs of diamtrical terminals, means for connecting a pair of said diametrical terminals each to different normally equipotential points of said pair of balanced motor circuits, means connecting said exciter third field exciting winding to the other pair of said diametrical terminals of said bridge circuit for energizing said exciter third field exciting winding responsive to unbalanced currents flowing in said bridge due to unbalance in said motor normally balanced circuits for providing a component of excitation along said exciter secondary brush commutating axis in opposition to the component of excitation provided by said exciter control field exciting winding for decreasing the energization of said generator field exciting winding, and means connected to said exciter third field exciting winding for preventing energization of said third field exciting winding in opposition to said exciter control field exciting winding below a predetermined unbalance in said motor normally balanced circuits.

19. A power system for a self-propelled vehicle including a prime mover, an electric generator arranged to be driven by said prime mover, a plurality of driving motors, means for connecting said motors to said generator, means including a field exciting winding for controlling the characteristics of said generator, an armature reaction excited exciter having a set of primary brushes and a set of secondary brushes for providing a primary and a secondary circuit through said exciter, means for connecting said generator field exciting winding to said exciter secondary brushes, means including a control field exciting winding for providing a component of excitation along the exciter secondary brush commutating axis, means including a compensating field exciting winding for providing a component of excitation along the exciter secondary brush commutating axis substantially equal and opposite to the armature reaction of electric current through said exciter secondary brushes, a third field exciting winding arranged to provide a component of excitation along the exciter secondary brush commutating axis, means for connecting said motors in a pair of normally balanced electrical circuits, an electrical bridge circuit having four unidirectional current branches connected in a loop providing a full wave rectifier with a pair of diametrical terminals each connected to a pair of connected bridge branches having opposite unidirectional current characteristics and connected to different normally equipotential points of said pair of balanced motor circuits, a second pair of diametrical terminals each connected to a pair of connected bridge branches having the same direction unidirectional current characteristics, and means connecting said exciter third field exciting winding to the latter pair of said diametrical terminals for energizing said exciter third field exciting winding responsive to unbalanced currents flowing in said bridge due to unbalance in said motor normally balanced circuits for providing a component of excitation along said exciter secondary brush commutating axis in opposition to the component of excitation provided by said exciter control field exciting winding.

20. A power system for a self-propelled vehicle including a prime mover, an electric generator arranged to be driven by said prime mover, an even number of driving motors, means for connecting said motors to said generator, means including a field exciting winding for controlling the characteristics of said generator, an armature reaction excited exciter having a set of primary brushes and a set of secondary brushes for providing a primary and a secondary circuit respectively through said exciter, means for connecting said generator field exciting winding to said exciter secondary brushes, means including a control field exciting winding for providing a component of excitation along the exciter secondary brush commutating axis, means including a compensating field exciting winding for providing a component of excitation along the exciter secondary brush commutating axis substantially equal and opposite to the armature reaction of electric current through said exciter secondary brushes, a third field exciting winding arranged to provide a component of excitation along the exciter secondary brush commutating axis, means for connecting said motors in a pair of normally balanced electrical circuits, an electrical bridge circuit having two pairs of diametrical terminals, means for connecting a pair of said diametrical terminals each to different normally equipotential points of said pair of balanced motor circuits, means connecting said exciter third field exciting winding to the other pair of said diametrical terminals of said bridge circuit for energizing said exciter third field exciting winding responsive to unbalanced currents flowing in said bridge due to unbalance in said motor normally balanced circuits for providing a component of excitation along said exciter secondary brush commutating axis in opposition to the component of excitation provided by said exciter control field exciting winding for decreasing the energization of said generator field exciting winding, and means connected to said exciter third field exciting winding for preventing energization thereof below a predetermined unbalance in said motor normally balanced circuits.

21. A power system for a self-propelled vehicle including a prime mover, an electric generator arranged to be driven by said prime mover, an even number of driving motors, means for connecting said motors to said generator, means including a field exciting winding for controlling the characteristic of said generator, an armature reaction excited exciter having a set of primary brushes and a set of secondary brushes for providing a primary and a secondary circuit respectively through said exciter, means for connecting said generator field exciting winding to said exciter secondary brushes, means including a control field exciting winding for providing a component of excitation along the exciter secondary brush commutating axis, means including a compensating field exciting winding for providing a component of excitation along the exciter secondary brush commutating axis substantially equal and opposite to the armature reaction of electric current through said exciter secondary brushes, a third field exciting winding arranged to provide a component of excitation along the exciter secondary brush commutating axis, means for connecting said motors in a pair of normally balanced electrical circuits, an electrical bridge circuit having two pairs of diametrical terminals, means for connecting a pair of said diametrical terminals each to different normally equipotential points of said pair of balanced motor circuits, means connecting said exciter third field exciting winding to the other pair of said diametrical terminals of said bridge circuit for energizing said exciter third field exciting winding responsive to unbalanced currents flowing in said bridge due to unbalance in said motor normally balanced circuits for providing a component of excitation along said exciter secondary brush commutating axis in opposition to the component of excitation provided by said exciter control field exciting winding for decreasing the energization of said generator field exciting winding, and means including a controllable voltage source of electric power supply connected to said exciter third field exciting winding in opposition to the energization of said bridge circuit for preventing energization of said third field exciting winding in opposition to said exciter control field exciting winding below a predetermined unbalance in said motor normally balanced circuits.

22. A power system for a vehicle including a plurality of driving motors, means for connecting said motors to a source of electrical power supply, dynamo-electric means for controlling the torque developed by said motors, a control field exciting winding for said dynamo-electric means, means for connecting said motors in a pair of normally balanced electrical circuits, a second field exciting winding arranged to provide a component of excitation to said dynamo-electric means along the same axis as said control field exciting winding, means for energizing said second field exciting winding responsive to unbalance in said motor normally balanced circuits for providing a component of excitation in opposition to the component of excitation provided by said dynamo-electric means control field exciting winding for restoring substantially balanced torques to all of said motors.

MORRIS J. BALDWIN.